Figure 1:
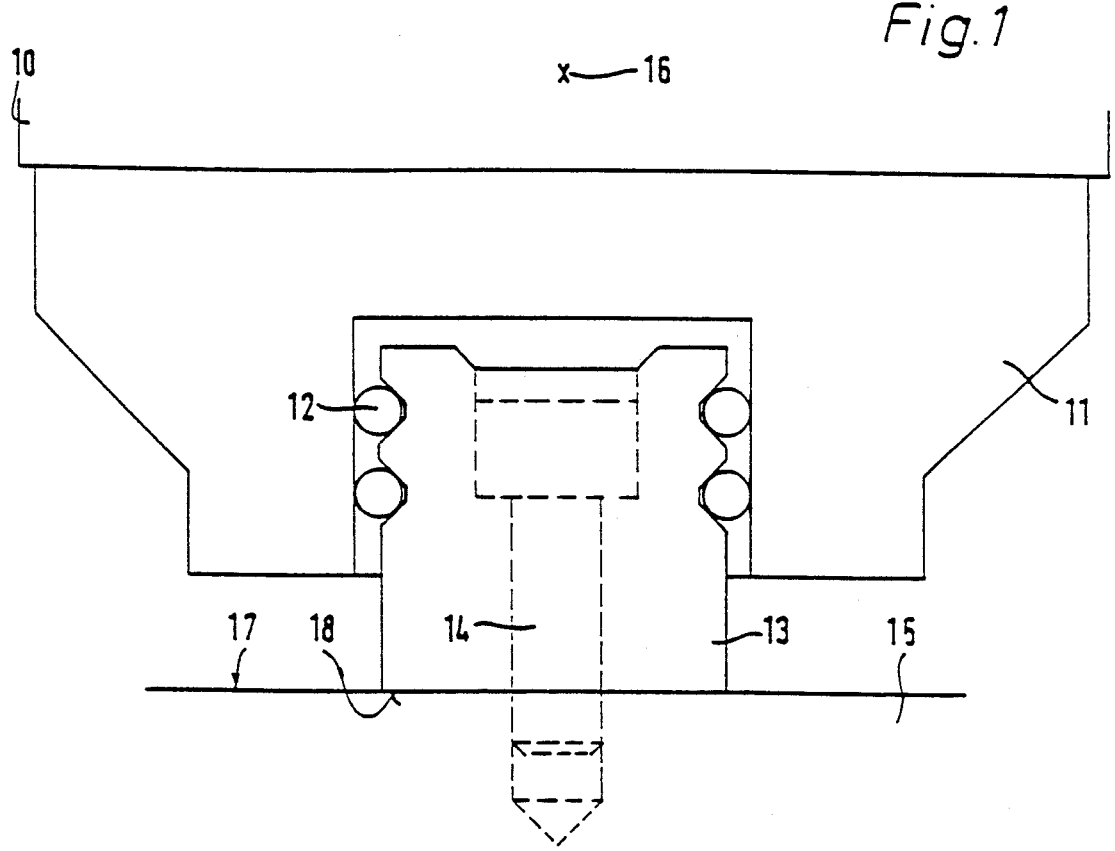

United States Patent [19]
Winkler et al.

[11] Patent Number: 5,058,253
[45] Date of Patent: Oct. 22, 1991

[54] MACHINE TOOL

[75] Inventors: Hans-Henning Winkler, Tuttlingen; Eugen Rütschle, Mühlheim, both of Fed. Rep. of Germany

[73] Assignee: Chiron-Werke GmbH & Co. KG, Tuttlingen, Fed. Rep. of Germany

[21] Appl. No.: 256,821

[22] Filed: Oct. 11, 1988

[30] Foreign Application Priority Data

Oct. 14, 1987 [DE] Fed. Rep. of Germany ....... 3734720

[51] Int. Cl.$^5$ .......................... B23Q 1/26; F16C 29/00
[52] U.S. Cl. .......................................... 29/57; 384/39; 409/241
[58] Field of Search ................. 29/DIG. 94, 57, 33 R, 29/DIG. 101, 459, 33 K; 409/235, 241; 384/41, 45, 39, 40, 42, 43, 44, 7; 269/82, 83

[56] References Cited

U.S. PATENT DOCUMENTS

| | | | |
|---|---|---|---|
| 2,195,841 | 4/1940 | Schlitters | 384/39 |
| 3,498,685 | 3/1970 | Poplinski | 384/40 |
| 3,674,323 | 7/1972 | Zankl et al. | 384/40 |
| 4,534,093 | 8/1985 | Jahnke et al. | 29/26 A |
| 4,553,794 | 11/1985 | Teramachi | 384/44 |
| 4,626,299 | 12/1986 | Knight et al. | 384/42 X |
| 4,753,540 | 6/1988 | Mottate | 384/7 |

FOREIGN PATENT DOCUMENTS

| | | | |
|---|---|---|---|
| 1665610 | 10/1953 | Fed. Rep. of Germany | . |
| 3302432 | 7/1984 | Fed. Rep. of Germany | 409/235 |
| 241380 | 4/1969 | U.S.S.R. | 384/42 |
| 1156896 | 5/1985 | U.S.S.R. | 409/241 |

OTHER PUBLICATIONS

Broschure Type, "FZ 16", of Chiron-Werke GmbH & Co. KG.

*Primary Examiner*—William Briggs
*Attorney, Agent, or Firm*—Rosenblum, Parish & Bacigalupi

[57] ABSTRACT

A machine tool comprises two motion units, in particular a spindle stock and a machine bed, arranged for being displaced relative to each other along one axis. A guideway is fixed to a first motion unit for guiding the displaceable motion unit, a first surface of the guideway being in contact with, and screwed to a second surface of the first motion unit. In order to prevent the guideways from being dislodged in a direction perpendicular to the longitudinal axis of the machine screws, for example when the spindle stock runs up against a stationary obstacle due to improper operation, at least one of the said surface is roughened.

6 Claims, 1 Drawing Sheet

MACHINE TOOL

The present invention relates to a machine tool comprising two motion units, in particular a spindle stock and a machine bed, arranged for being displaced relative to each other along one axis, and a guideway fixed to a first motion unit for guiding the displaceable motion unit, a first surface of the guideway being in contact with, and screwed to a second surface of the first motion unit.

A machine tool of the type described above has become known through a product of applicant known under the model designation FZ 16.

It has been previously known in connection with machine tools to move a workpiece and the tool relative to each other in order to enable machining operations to be carried out on the workpiece. With most of the known machine tools, this movement is performed along Cartesian coordinates, for example by mounting the workpiece on a work table and moving either the work table or the spindle stock with the spindle, or both these units, along linear axes. The spindle axis may in this case be arranged vertically or horizontally.

In the case of the known machine, this linear movement is achieved, technically, by the fact that the spindle stock is guided on two guideways which are screwed to the stationary machine bed of the machine tool, and the spindle stock is displaced along the guideways by means of a ball screw drive, for example.

The known machine tools use guideways with longitudinal ball bearing guides which are commercially available as finished products. The surfaces of the commercially available guideways are precision finished, usually ground, on all surfaces. The area of the surface of the machine bed where the guideway is to be fixed, is also precision-finished, i.e. also ground, so that precise alignment of the guideways, in particular mutual precise axial alignment of the two guideways, is obtained by the contact between the ground surfaces of the guideway and the machine bed.

However, it has been found that this configuration provides certain drawbacks in practice.

For, if a machine tool of the type described above is improperly adjusted, it may happen that the spindle stock, with the tool chucked therein, runs up at its full speed of feed against a workpiece mounted on the work table. In the case of such an unwanted collision between the tool and the workpiece, extremely high forces are released which act also on the contact surface between the guideways and the machine bed. The extreme forces released by such a collision may result in slight displacements at the points of contact between the ground surfaces of the guideways and the machine bed, with the consequence that the machine tool must be disassembled and re-adjusted.

Now, it is the object of the present invention to improve a machine tool of the type described above in such a manner that the guideways are prevented from getting displaced, even if the motion units should hit against each other unwantedly.

This object is achieved according to the invention by the fact that at least one of the surfaces is roughened.

The problem underlying the present invention is solved in this manner fully and perfectly because the use of a roughened surface results in a friction coefficient between the guideways and the coacting motion unit which, when added to the high axial tightening forces of the machine screws, is capable of withstanding even high peak forces acting in the radial direction of the machine screws. It is possible in this manner, in the case of an unwanted collision between the motion units, to restrict any damage resulting therefrom for example to the area of the tool and of the workpiece, and to avoid that the machine tool has to be re-adjusted following such a collision.

According to a preferred embodiment of the invention, the first upper surface of the guideway is roughened, while its other surfaces are ground.

This feature provides the advantage that the roughening operation can be carried out on a machine element which is easy to handle, namely on the guideway.

According to another preferred embodiment of the invention, the surface is roughened in an area corresponding to the pressure cones of the fitted machine screws.

This feature provides the advantage that the zone where the friction coefficient is increased is limited to that geometrical area where most of the axial tightening forces of the machine screws are exerted, while the remaining surfaces may remain in their precision-finished, for example ground state so that the alignment of the guideways with respect to the respective motion unit remains unaffected.

Finally, another embodiment of the invention is particularly preferred where the surfaces are roughened by an electrical discharge machining process.

This feature provides the advantage that the use of an electrical discharge machining process enables the surface to be roughened in a precisely defined and reproducible manner. For, it is important that the roughening process be carried out in such a manner that when the mating roughened surfaces of the guideway and the respective motion unit come to rest against each other, the total roughness does not result in any deviation of the alignment of the guideway from a predetermined ideal position. It is, therefore, necessary to keep the roughness of the one or of both surfaces in the $\mu$ range so that the advantage provided by the roughened surfaces is not achieved at the price of disadvantages with respect to the alignment accuracy of the guideways.

Other advantages of the invention will appear from the following description and the attached drawing.

It is understood that the features which have been described above and will be explained hereafter may be used not only in the described combinations, but also in other combinations or individually, without leaving the scope and intent of the present invention.

Figure 2:
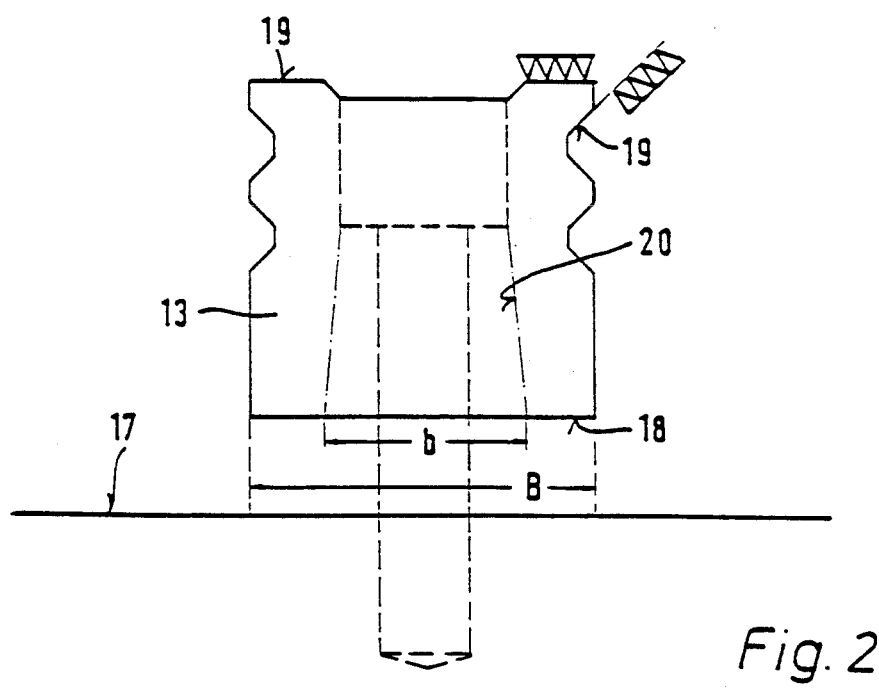

One embodiment of the invention will now be described in more detail with reference to the drawing in which:

FIG. 1 shows an end view of a guiding arrangement of a spindle stock of a machine tool according to the invention; and FIG. 2 shows a diagrammatic representation of the guideway shown in FIG. 1, illustrating the approach according to the invention.

Referring now to FIG. 1, reference numeral 10 indicates a spindle stock of a machine tool which is equipped at its bottom with two carriages one of which is indicated at 11. The carriage 11 is supported on longitudinal ball bearings 12, which are indicated in FIG. 1 only very diagrammatically and which coact with a guideway 13 extending perpendicularly to the drawing plane of FIG. 1.

The guideway 13 is fixed to a machine bed 15 by means of machine screws 14 distributed over its length, so that the whole spindle stock 10 can be displaced along an axis 16 extending perpendicularly to the drawing plane of FIG. 1.

The guideway 13 rests upon a first surface 17 of the machine bed 15 by a second bottom face 18 of the guideway 13.

When commercially available guideways 13 are used, all surfaces—designated by 19 in FIG. 2—are precision-finished, usually ground.

Given the fact that the first surface 17 of the machine bed 15 is ground, too, the use of a commercially available guideway 13 in unchanged condition would lead to the condition that a ground second surface 18 of the guideway 13 would come to rest against a likewise ground first surface 17 of the machine bed 15. Due to the extremely small friction coefficient then existing between the matched ground surfaces, even an extremely high axial tightening force of the machine screws 14 would not suffice to withstand a sudden impact exerted upon the guideway 13 in a direction perpendicular to the longitudinal axis of the machine screws 14. Such an impact may be exerted on the guideway 13 for example when the spindle stock 10 hits against a stationary obstacle, due to erroneous programming of its travel, for example when the tool fitted in a spindle of the spindle stock 10 hits against a workpiece mounted on a work table. Given the fact that the machine screws 14 produce only an axial clamping force between the guideway 13 and the machine bed 14, without however centering the guideway 13 in the radial direction of the machine screw 14, the guideway 13 will be slightly dislodged under the effect of such a sudden impact as the machine screws 14 are held in their respective stepped through-holes in the guideway 13 with a certain radial play.

In order to avoid this, one roughens for example the second surface 18 of the guideway 13, using conveniently a machining process which permits to achieve a highly precise and reproducible roughness in the $\mu$ range. In this connection, the use of the electric discharge machining process is particularly preferred as this process meets all the demands described before.

On the other hand, it is of course also possible to roughen additionally the first surface 17 of the machine bed 15, in which case the combined action of the roughness of both surfaces is adjusted in such a manner that no changes in position of the guideway 13 will result as compared with the coacting of ground surfaces.

To this end, the surfaces 18 and/or 17 may be roughened either over the full width B of the guideway 13, or only in the smaller area b defined by the pressure cone 20 produced by the tightened machine screw 14 in the plane of the surfaces 17, 18.

What is claimed is:

1. A machine tool, comprising a first displacement unit, a second displacement unit, and guiding means for enabling relative displacement of said first displacement unit relative to said second displacement unit along an axis, said guiding means including a guideway being bolted with a first surface thereof in engagement with a second surface of said first unit, one of said surfaces being roughened to a depth of several $\mu$ such that mating of said surfaces does not affect alignment of said displacement units relative to each other.

2. The machine tool of claim 1, wherein both said first surface and said second surface are roughened.

3. The machine tool of claim 1 wherein said guideway is roughened solely on a particular portion of said first surface whereas all remaining surfaces of said guideway are ground to a surface finish having a substantially smoother finish.

4. The machine tool of claim 1, wherein said one surface is roughened in a surface area only corresponding to a pressure cone generated by fitted machine screws used to bolt said guideway on said first unit.

5. The machine tool of claim 1, wherein said one surface is roughened by an electrical discharge machining process.

6. The machine tool of claim 1, in which said first unit is a machine bed and said second unit is a spindle stock.

* * * * *